(12) United States Patent
Blagodurov et al.

(10) Patent No.: US 10,073,746 B2
(45) Date of Patent: Sep. 11, 2018

(54) METHOD AND APPARATUS FOR PROVIDING DISTRIBUTED CHECKPOINTING

(71) Applicant: Advanced Micro Devices, Inc., Sunnyvale, CA (US)

(72) Inventors: Sergey Blagodurov, Bellevue, WA (US); Taniya Siddiqua, Bellevue, WA (US); Vilas Sridharan, Boxborough, MA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 76 days.

(21) Appl. No.: 15/207,943

(22) Filed: Jul. 12, 2016

(65) Prior Publication Data

US 2018/0018242 A1 Jan. 18, 2018

(51) Int. Cl.
*G06F 11/00* (2006.01)
*G06F 11/14* (2006.01)
*G06F 3/06* (2006.01)

(52) U.S. Cl.
CPC ........ *G06F 11/1471* (2013.01); *G06F 3/0604* (2013.01); *G06F 3/067* (2013.01); *G06F 3/0631* (2013.01); *G06F 2201/805* (2013.01); *G06F 2201/84* (2013.01)

(58) Field of Classification Search
USPC ....... 714/6.1, 6.2, 42, 43, 34, 35, 25, 49, 13
See application file for complete search history.

(56) References Cited

U.S. PATENT DOCUMENTS

| 8,788,879 | B2 | 7/2014 | Blumrich et al. | |
| 2006/0150010 | A1* | 7/2006 | Stiffler | G06F 11/1438 714/13 |
| 2011/0016354 | A1* | 1/2011 | Douros | G06F 11/1438 714/16 |
| 2011/0296241 | A1* | 12/2011 | Elnozahy | G06F 11/1438 714/19 |
| 2012/0204060 | A1* | 8/2012 | Swift | G06F 11/1435 714/15 |
| 2012/0216073 | A1* | 8/2012 | Douros | G06F 9/485 714/19 |

(Continued)

OTHER PUBLICATIONS

Dong et al., "Hybrid Checkpoint Using Emerging Non-Volatile Memories for Future Exascale Systems," ACM Journal, vol. 2, No. 3, 2004.

*Primary Examiner* — Sarai E Butler
(74) *Attorney, Agent, or Firm* — Faegre Baker Daniels LLP

(57) ABSTRACT

Methods and apparatus presented herein provide distributed checkpointing in a multi-node system, such as a network of servers in a data center. When checkpointing of application state data is needed in a node, the methods and apparatus determine whether checkpoint memory space is available in the node for checkpointing the application state data. If not enough checkpoint memory space is available in the node, the methods and apparatus request and find additional checkpoint memory space from other nodes in the system. In this manner, the methods and apparatus can checkpoint the application state data into available checkpoint memory spaces distributed among a plurality of nodes. This allows for high bandwidth and low latency checkpointing operations in the multi-node system.

21 Claims, 8 Drawing Sheets

(56) References Cited

U.S. PATENT DOCUMENTS

| | | | |
|---|---|---|---|
| 2014/0136895 A1* | 5/2014 | Fleischer | G06F 11/14 |
| | | | 714/17 |
| 2014/0258777 A1* | 9/2014 | Cheriton | G06F 11/1471 |
| | | | 714/19 |
| 2015/0113325 A1* | 4/2015 | Wholey, III | G06F 11/1448 |
| | | | 714/20 |
| 2016/0026546 A1* | 1/2016 | Ljubuncic | G06F 11/1469 |
| | | | 714/19 |

* cited by examiner

METHOD AND APPARATUS FOR PROVIDING DISTRIBUTED CHECKPOINTING

BACKGROUND OF THE DISCLOSURE

The disclosure relates generally to methods and apparatus that provide checkpointing operations in multi-node systems.

Fault tolerance is a feature that helps a multi-node system (e.g., a network of servers in a data center) to recover quickly from unexpected failures. Short of totally eliminating all failures, the goal of fault tolerance is to minimize the amount of time required to bring the system back on-line after a failure event, and to ensure that the failure does not cause any crucial data to become lost. One technique for achieving fault tolerance is known as checkpointing. In this scheme, the state of an application executing in a node in the system is periodically backed-up as a series of checkpoints. Thus, if and when the application is interrupted by the occurrence of a fault (e.g., a software crash, a hardware failure, a scheduled maintenance, etc.), the state of the application is rolled back to a checkpoint just prior to the occurrence of the fault so that the state data of the application can be safely resumed or recovered without any loss of data or continuity. The state data may include, for example, data from registers, databases, processor pipelines, and any other data representing a state of a process operation in a computing node.

Conventional approaches to checkpointing in a multi-node system rely on the use of separate or off-node disk-based input and output (I/O) storage units. As such, checkpointing typically requires saving or writing data from nodes in the system to the disk-based I/O storage units. However, this can incur a high level of latency due to the amount of I/O traffic involved and/or limitations placed on bandwidth availability. To reduce latency, burst buffers, which sit between the nodes and the disk-based I/O storage units, have been employed to achieve faster caching of data. However, the use of burst buffers also introduces an additional layer of nodes into the system, which increases the complexity of the system and may impact scalability. Therefore, an opportunity exists to develop more efficient checkpointing methods that can improve one or more of system performance, scalability and throughput.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
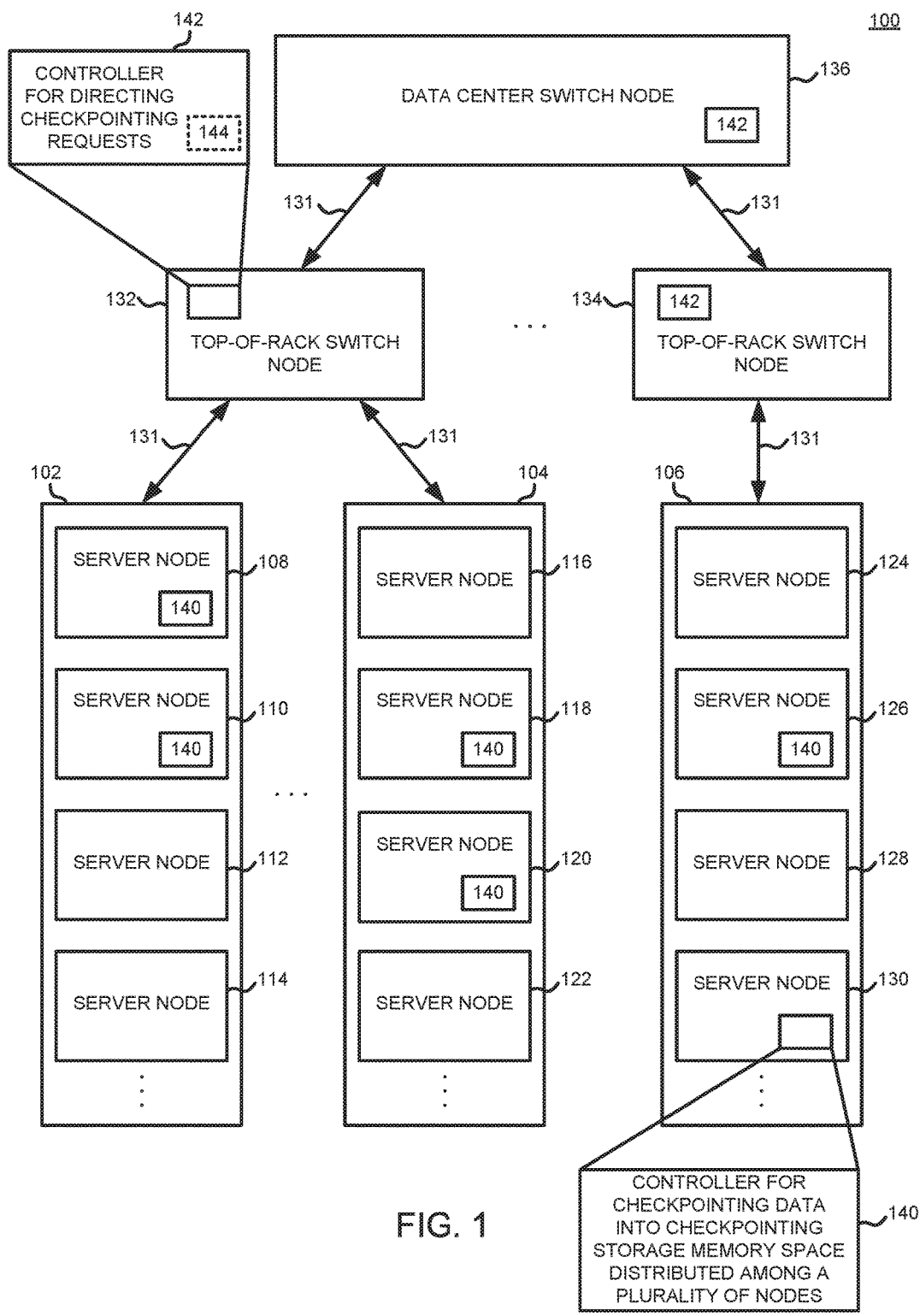
FIG. 1 is a block diagram illustrating one example of a multi-node system in which distributed checkpointing is provided.

Briefly, methods and apparatus provide distributed checkpointing in a multi-node system, such as a network of servers in a data center. When checkpointing of application state data is needed in a node, the methods and apparatus determine whether checkpoint memory space is available in the node for checkpointing the application state data. If not enough checkpoint memory space is available in the node, the methods and apparatus request and find additional checkpoint memory space from other nodes in the system. In this manner, the methods and apparatus can checkpoint the application state data into available checkpoint memory spaces distributed among a plurality of nodes.

In one example, a method and apparatus for checkpointing data is described. The method and apparatus includes a controller that determines an amount of checkpointing storage memory space needed for checkpointing state data corresponding to an application. The controller checkpoints the state data (e.g., store the data) corresponding to the application into the checkpointing storage memory space by distributing the state data among available non-volatile random access memories (NVRAMs) in a plurality of nodes in a network based on the determination.

In another example, the controller checkpoints the state data by storing some of the state data in available NVRAMs in a node executing the application and distributing a remainder of the state data among the available NVRAMs in other nodes of the plurality of nodes in the network. In distributing the remainder of the state data, the controller sends a checkpointing memory allocation request message to at least another node in the plurality of nodes in the network in response to determining that there is not enough free memory space in the available NVRAMs in the node executing the application for checkpointing. The checkpointing memory allocation request message indicates that additional checkpoint memory space is needed.

In another example, the controller obtains a checkpointing memory request message from a node in the plurality of nodes in the network. The checkpointing memory request message indicates that a checkpointing operation is needed or required in the node to checkpoint the state data. The controller then profiles at least one NVRAM in the node to determine whether free memory space is available in the at least one NVRAM in the node for use as the amount of checkpointing storage memory space. Profiling entails that the controller determine how much memory space is in the at least one NVRAM, and how much of that memory space is being used and how much of that memory space is available. Accordingly, the controller sends a checkpointing memory allocation request message from the node to at least another node in the plurality of nodes in the network in response to determining that not enough free memory space is available in the at least one NVRAM in the node for use as the amount of checkpointing storage memory space.

The controller obtains a checkpointing memory allocation reply message from the at least another node in the plurality of nodes in response to the checkpointing memory allocation request message. The checkpointing memory allocation reply message indicates that the at least another node has additional checkpoint memory space available. As such, the controller allocates a first portion of the amount of checkpointing storage memory space to free memory space available in the at least one NVRAM in the node, and allocates remaining portions of the amount of checkpointing storage memory space to free memory space available in at least one NVRAM in the at least another node.

Moreover, allocating the first portion of the amount of checkpointing storage memory space to the free memory space and allocating the remaining portions of the amount of checkpointing storage memory space are based on at least one of a size of the state data corresponding to the application or whether execution of the application is critical. For example, the execution of the application is critical or important if the application is computationally intensive to run, or takes a long time to run or runs frequently.

The controller further stores an identity of the plurality of nodes in the network in which the state data corresponding to the application was checkpointed to. Thus, in response to a failure event, the controller restores a state of the application prior to the failure event based on recovered checkpointed state data using the identity of the plurality of nodes.

The controller further determines a second checkpointing storage memory space needed for mirroring checkpointed data in response to determining that checkpointing mirroring is required. The controller then mirrors the checkpointed state data in the second checkpointing storage memory space distributed among the available NVRAMs in the plurality of nodes in the network.

In one example, an apparatus includes a controller that obtains a checkpointing memory allocation request message from a node in a plurality of nodes in a network. The controller provides checkpointing by directing the checkpointing memory allocation request message from the node to at least another node in the plurality of nodes in the network to distribute state data corresponding to an application for the node among the plurality of nodes in the network.

In another example, the controller obtains a checkpointing memory allocation reply message from the at least another node in response to the checkpointing memory allocation request message. From the checkpointing memory allocation reply message, the controller determines whether free memory space is available in at least one NVRAM in the at least another node for use as checkpointing storage memory space for checkpointing the state data corresponding to the application. The controller directs the checkpointing memory allocation request message from the node to other nodes in the plurality of nodes in the network in response to determining that free memory space is not available in the at least one NVRAM in the at least another node for use as the checkpointing storage memory space.

The controller searches a checkpointing table to find the at least another node having free memory space available in at least one NVRAM for use as the checkpointing storage memory space. The controller can generate the checkpointing table by obtaining information indicating free memory space availability in at least one NVRAM from each of the plurality of nodes in the network.

In one example, a node includes at least one processor, at least one NVRAM and a controller coupled to both the at least one processor and the at least one NVRAM. The controller is configured to determine an amount of checkpointing storage memory space needed for checkpointing state data corresponding to an application that is being executed by the at least one processor in the node. The controller is also configured to determine available free memory space in the at least one NVRAM in the node for use as the amount of checkpointing storage memory space. As such, the controller then checkpoints the state data corresponding to the application into the amount of checkpointing storage memory space by distributing the state data among the available free memory space determined in the at least one NVRAM in the node and available NVRAMs in other nodes of a plurality of nodes in a network.

Among other advantages, the methods and apparatus provide fast access to both saving and retrieving checkpointed data in multi-node systems by bypassing I/O traffic that is inherent to many conventional approaches such as disk-based storage or burst buffers. As a result, the methods and apparatus can achieve improved system performance, availability, and efficiency.

Turning now to the drawings, FIG. 1 illustrates an example multi-node system 100 in which distributed checkpointing is provided. As shown, the system 100 is in the form of a data center that includes various apparatuses such as nodes and controllers. In particular, each node in the system 100 is represented by either a server or switch. However, in general, the system 100 can be any type of networked multiple node system (e.g., a supercomputer, a computing grid, etc.). Accordingly, a node can be any suitable point or device that is connected to or part of the multi-node system 100.

As shown, the system 100 includes multiple server racks 102-106, each of which includes one or more server nodes. In particular, the server rack 102 includes server nodes 108-114, the server rack 104 includes server nodes 116-122, and the server rack 106 includes server nodes 124-130. The server racks 102 and 104 are communicatively coupled to a top-of-rack (TOR) switch node 132 via a connection 131, while the server rack 106 is communicatively coupled to another TOR switch node 134 via the connection 131. The switch nodes 132 and 134 are communicatively coupled to a data center switch node 136 via the connection 131. The connection 131 can be any suitable communication link that allows a network of servers and switches to communicate with each other. Accordingly, the server nodes in the server racks 102 and 104 communicate with each other via the TOR switch node 132, and the server nodes in the server rack 106 communicate with each other via the TOR switch node 134. The switch nodes 132 and 134, in turn, communicate with one another via the data center switch node 136.

As used herein, a server node describes a node that has a server, such as a web server, a proxy server, a gateway server, etc. A switch node describes a node that routes or directs communication between server nodes and/or other switch nodes. It should be noted that additional nodes (e.g., server nodes, switch nodes, and/or other types of nodes or components) can exist in the system 100 as the number and type of nodes are not limited to what is shown in FIG. 1. It is to be appreciated that any suitable number and type of nodes can be included in the system 100.

A controller 140 for checkpointing data into checkpointing storage memory space distributed among a plurality of nodes can be included in any of the server nodes 108-130. For example, the server nodes 108, 110, 112, 118, 120, 126 and 130 have the controller 140, while the server nodes 112, 114, 116, 122, 124 and 128 do not have the controller 140. Further, a controller 142 for directing checkpointing requests can be included in any of the switch nodes 132-136. For example, all of the switch nodes 132-136 have the controller 142.

The controllers 140, 142 include logic that can be implemented as either a microcontroller, an application-specific integrated circuit (ASIC), a field programmable gate array (FPGA), a programmable logic device (PLD), a digital signal processor (DSP), a state machine, discrete hardware components, or any other suitable processor including but not limited to a processor executing instructions stored in non-volatile memory, such as ROM, EEPROM, or any other suitable non-volatile memory. The functionalities of the controllers 140, 142 will be described in more detail below. In some embodiments, the controller 140 includes all the functionalities of the controller 142 or vice versa.

Generally speaking, checkpointing is a process in which data associated with an executing application is checkpointed or saved in the middle of the execution of the application, in order to facilitate recovery of the application in the event of a failure or interruption (e.g., due to soft errors, hardware or software failures, machine maintenance or reconfiguration, etc.). In the system 100, the checkpointing of data is performed in available checkpoint memory spaces, such as NVRAMs, distributed among a plurality of nodes in a network.

In an example scenario, a controller 140 in the server node 108 wants to checkpoint state data corresponding to an application being executed in the server node 108. To do so, the controller 140 determines a checkpointing storage memory space needed for checkpointing the state data corresponding to the application. The controller 140 in the server node 108 then determines whether free memory space is available in the server node 108 to checkpoint the state data. If there is free memory space available, then the controller 140 simply allocates the necessary free memory space in the server node 108 as the checkpointing storage memory space. However, if there is no free memory space or if there is not enough free memory space in the server node 108, the controller 140 tries to find needed additional free memory space elsewhere.

In particular, the controller 140 in the server node 108 sends a checkpointing request message to other server nodes requesting the needed additional free memory space. The controller 140 communicates with the other server nodes via the TOR switch node 132 (as all server node communication passes through the switch node 132). The TOR switch node 132, which has a controller 142, processes the checkpointing request message from the controller 140 in the server node 108 by directing the message to the other server nodes (e.g., the server node 110 in the server rack 102 and/or the server nodes 118, 120 in the server rack 104) to determine whether or not one of these nodes has the needed additional free memory space sought after by the server node 108. In some embodiments, the controller 142 in the TOR switch node 132 maintains a checkpointing table 144 that lists the server nodes in the server racks 102, 104 that have free memory space available. Thus, upon receiving the checkpointing request message from the server node 108, the controller 142 in the TOR switch node 132 searches the checkpointing table 144 and forwards the message to a server node listed in the table 144 that has the needed additional free memory space.

The controller 142 in the TOR switch node 132 can also function to arbitrate communication traffic amongst the different server nodes so as to prevent broadcasting storms. For example, to prevent communication clogging, the controller 142 in the TOR switch node 132 filters out repeated or excessive checkpointing request messages from a server node by ignoring or dropping some of the messages.

In situations where the needed additional free memory space cannot be found in the server nodes of the server racks 102, 104, the controller 142 in the TOR switch node 132 tries to find the needed additional free memory space in server nodes of other server racks. To do so, the controller 142 in the TOR switch node 132 directs the checkpointing request message from the server node 108 to the data center switch node 136. The data center switch node 136, which also has a controller 142, in turn directs the message to a controller 142 in the TOR switch node 134 to try to find the needed additional free memory space in the server nodes of the server rack 106 (e.g., the server nodes 126, 130). In some embodiments, the controller 142 in data center switch node 136 and/or the TOR switch node 134 each maintains a respective checkpointing table 144 of where free memory space is available, and as such, can forward the checkpointing request message from the server node 108 accordingly.

Once the needed additional free memory space is found, the controller 140 in the server node 108 distributes or allocates the checkpointing storage memory space among the different nodes. For example, if the server nodes 108, 110 and 118 are found to have the necessary free memory space, then the controller 140 in the server node 108 allocates a first portion of the checkpointing storage memory space to the free memory space in the server node 108, a second portion of the checkpointing storage memory space to the free memory space in the server node 110, and a third portion of the checkpointing storage memory space to the free memory space in the server node 118. The first, second and third portions can be equal or unequal portions that make up the whole checkpointing storage memory space.

Afterward, the controller 140 in the server node 108 checkpoints the state data corresponding to the application into the checkpointing storage memory space distributed among the different server nodes 108, 110 and 118. The controller 140 in the server node 108 also saves the identities of the server nodes 108, 110 and 118 (e.g., in a recovery list, not shown) so that controller 140 knows where to look for the checkpointed data should such a need arises. For example, in the event of a failure in the server node 108 that disrupts the execution of the application, the controller 140 retrieves the identities of the server nodes 108, 110 and 118 and recover the checkpointed data to restart the application at a point prior to the failure. By doing so, the controller 140 can safely resume the execution of the application without any loss of data or continuity.

It is noted that in the controllers 140, 142 are compliant with various power management protocols (e.g., intelligent platform management interface (IPMI), integrated lights-out (iLO), advanced lights out management (ALOM), etc.) such that in the case of a failure, the controllers 140, 142 can still operate to retrieve or recover any checkpointed data.

Moreover, to improve redundancy and reliability, the controller 140 in the server node 108 can mirror the checkpointed data in multiple other server nodes. In this manner, the same checkpointed data is duplicated and stored in different places such that a recovery request can be serviced by any of the multiple other server nodes that have the checkpointed data. This in turn helps to reduce the time for the recovery process itself. In an embodiment, the checkpointed data is mirrored in any or all of the available server nodes in a particular server rack. In another embodiment, the checkpointed data is mirrored in a switch node (e.g., the TOR switch node 132, if the switch node carries memory) such that the checkpointed data is accessible to any node that may be connected to the switch node.

Figure 2:
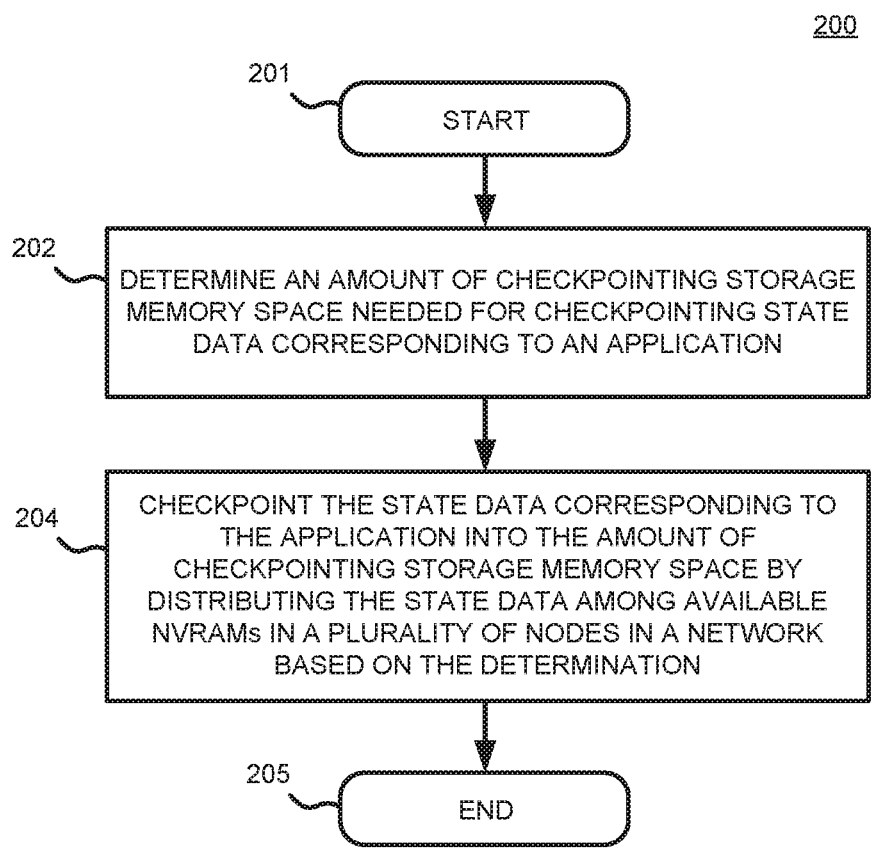
FIG. 2 is a flowchart illustrating one example of a method for providing distributed checkpointing.

FIG. 2 illustrates an example method 200 that provides distributed checkpointing. The method 200 can be carried out by the controllers 140, 142. The method 200 starts at block 201 where a checkpointing procedure is initiated. For example, the checkpointing procedure is initiated when the controller 140 receives a checkpointing memory request message to start checkpointing data (see FIG. 3). In block 202, the method 200 determines an amount of checkpointing storage memory space needed for checkpointing state data corresponding to an application. In block 204, the method 200 checkpoints the state data corresponding to the application into the amount of checkpointing storage memory space by distributing the state data among available non-volatile random access memories (NVRAMs) in a plurality of nodes in a network based on the determination. Once checkpointing of the state data is finished, the method 200 ends at block 205, where the method 200 waits until the start of another checkpointing procedure.

In one example, the method 200 stores a portion of the state data in available NVRAMs in a node executing the application in the plurality of nodes in the network, and distributes a remainder of the state data among the available NVRAMs in other nodes of the plurality of nodes in the network. In distributing the remainder of the state data, the method 200 sends a checkpointing memory allocation request message to at least another node in the plurality of nodes in the network in response to determining that there is not enough free memory space in the available NVRAMs in the node executing the application for checkpointing.

Figure 3:
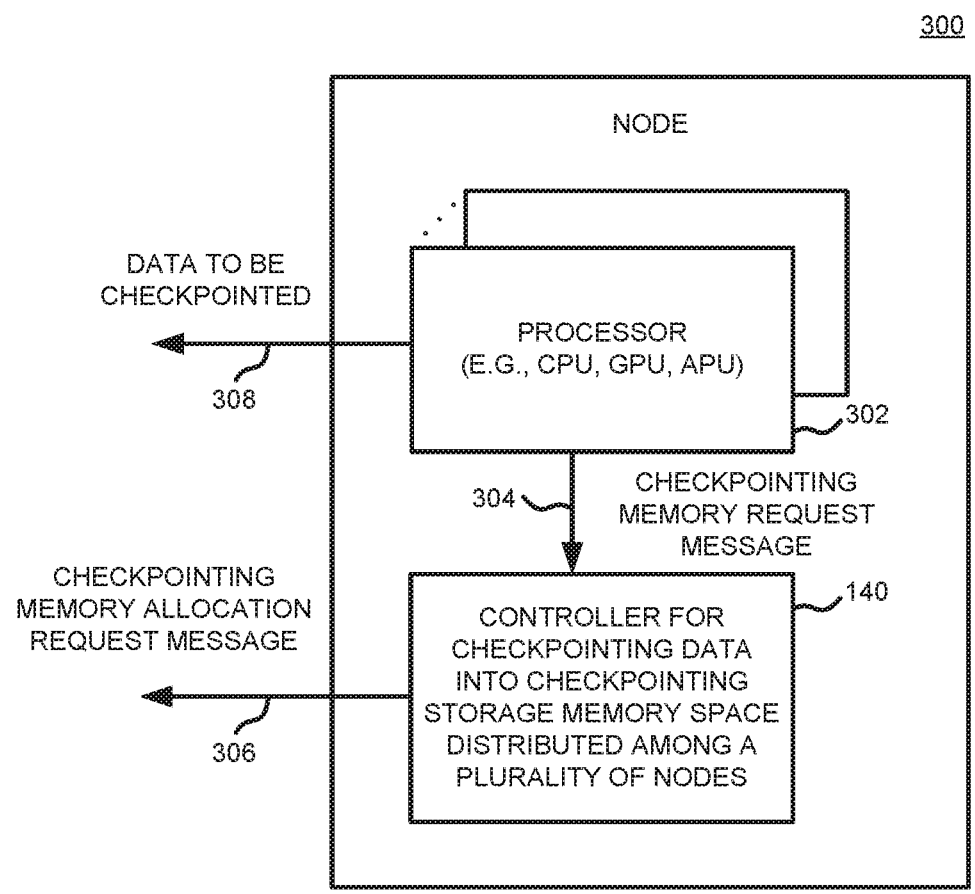
FIG. 3 is a block diagram illustrating one example of a node in which distributed checkpointing is provided.
Figure 4:
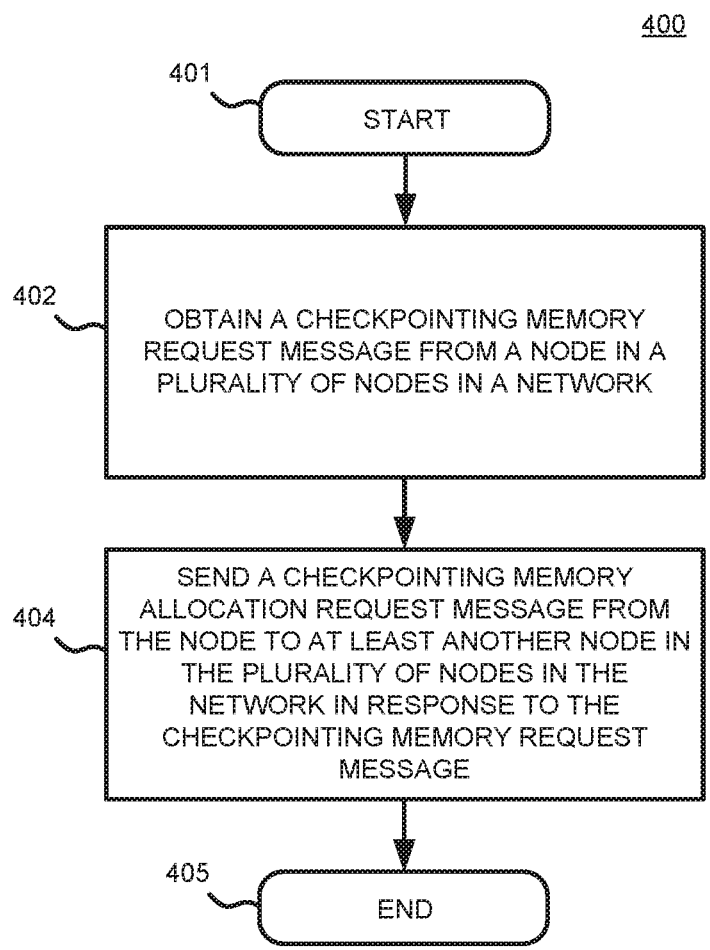
FIG. 4 is a flowchart illustrating one example of a method for providing distributed checkpointing.

FIGS. 3 and 4 illustrate an example node 300 and an example method 400, respectively. The node 300 can be a server node in a plurality of nodes in a network. For example, the node 300 represents any one of the server nodes 108, 110, 118, 120, 126 and 130 in FIG. 1. The node 300 includes a controller 140 that is operatively coupled to at least one processor 302. The at least one processor 302 can be any suitable instruction processing device (e.g., a central processing unit (CPU), a graphics processing unit (GPU), an accelerated processing unit (APU) or any combination thereof) that can operate to execute applications running in the node 300.

The method 400 is carried out by the controller 140 in the node 300 to provide distributed checkpointing. In particular, the at least one processor 302 notifies the controller 140 when checkpointing of data 308 is required (block 401). The data 308 can be state data (e.g., data from registers, databases, processor pipelines, etc.) associated with an application that is being executed by the at least one processor 302 in the node 300, for example. As such, the controller 140 obtains a checkpointing memory request message 304 from the node 300 in the plurality of nodes in the network (block 402). However, because the node 300 does not include any NVRAM, the controller 140 sends a checkpointing memory allocation request message 306 from the node 300 to at least another node in the plurality of nodes in the network in response to the checkpointing memory request message 304 (block 404). The controller 140 then waits for replies or responses from the at least another node (block 405).

Figure 5:
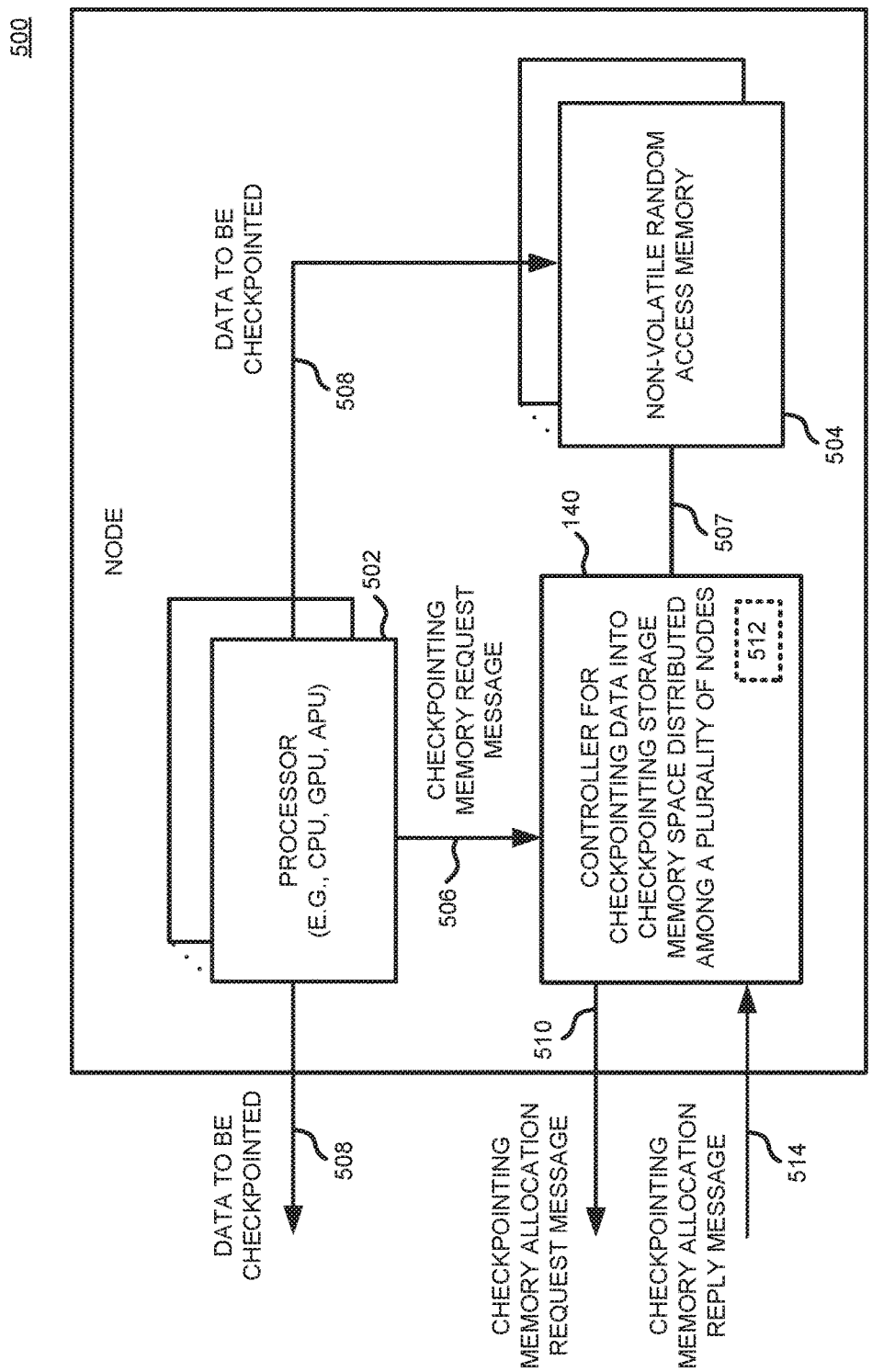
FIG. 5 is a block diagram illustrating one example of a node in which distributed checkpointing is provided.
Figure 6:
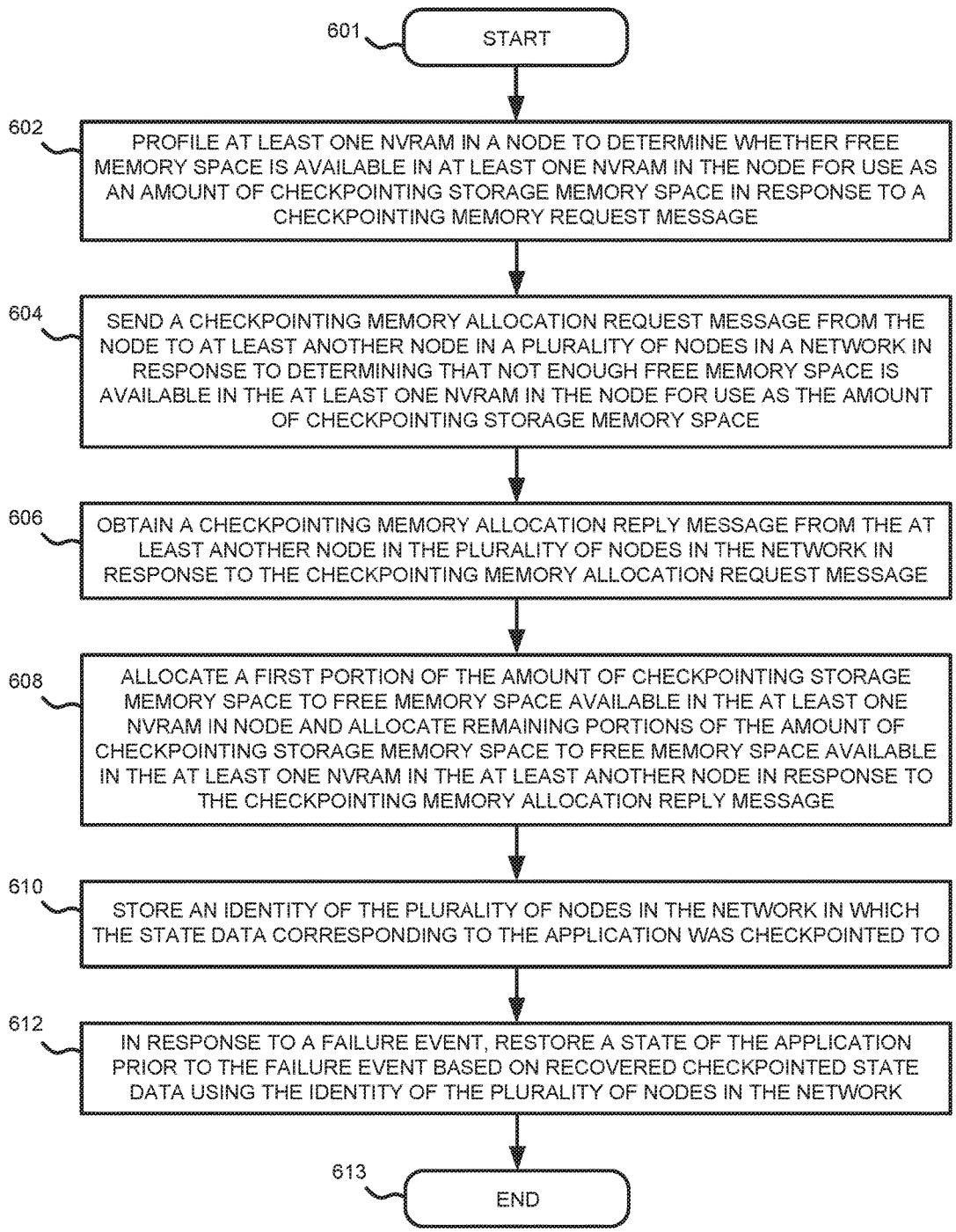
FIG. 6 is a flowchart illustrating one example of a method for providing distributed checkpointing.

FIGS. 5 and 6 illustrate an example node 500 and an example method 600, respectively. The node 500 can be a server node in a plurality of nodes in a network. For example, the node 500 represents any of the server nodes 108, 110, 118, 120, 126 and 130 in FIG. 1. The node 500 includes a controller 140 that is operatively coupled to at least one processor 502 and at least one NVRAM 504. The at least one processor 502 is similar to the at least one processor 302 in FIG. 3. The at least one NVRAM 504 can be any suitable random access memory device that retains information when power is turned off. For example, the at least one NVRAM 504 includes phase change RAM (PCRAM), ferroelectric RAM (FeRAM), magnetoresistive RAM (MRAM), spin-torque transfer magnetic RAM (STT-MRAM), memristor, millipede memory, carbon nanotube memory, flash memory, battery-backed static RAM, and the like.

In an embodiment, the controller 140 in the node 500 determines an amount of checkpointing storage memory space needed for checkpointing state data corresponding to an application being executed by the at least one processor 502 in the node 500. The controller 140 then determines available free memory space in the at least one NVRAM 504 in the node 500 for use as the amount of checkpointing storage memory space. Accordingly, the controller 140 checkpoints the state data corresponding to the application into the amount of checkpointing storage memory space by distributing the state data among the available free memory space determined in the at least one NVRAM 504 in the node 500 and available NVRAMs in other nodes of a plurality of nodes in a network.

The method 600 is carried out by the controller 140 in the node 500 to provide distributed checkpointing. In particular, the at least one processor 502 notifies the controller 140 that checkpointing of data 508 is required (block 601). For example, the at least one processor 502 generates a checkpointing memory request message 506 to notify the controller 140. The data 508 can be state data associated with an application that is being executed by the at least one processor 502 in the node 500, for example. The controller 140 determines an amount of checkpointing storage memory space needed for checkpointing the data 508 corresponding to the application in response to the checkpointing memory request message 506. Further, because the node 500 includes NVRAM, the controller 140 profiles the at least one NVRAM 504 in the node 500 (e.g., via connection 507) to determine whether free memory space is available in the at least one NVRAM 504 in the node 500 for use as the amount of checkpointing storage memory space in response to the checkpointing memory request message 506 (block 602).

Generally, the checkpointing memory request message 506 indicates that checkpointing of the data 508 is needed or required. Accordingly, the controller 140 profiles the at least one NVRAM 504 to determine how much memory space in the at least one NVRAM 504, and how much of that memory space is being used and how much is available. Through profiling, the controller 140 determines that there is sufficient free memory space available in the at least one NVRAM 504 in the node 500. As such, the controller 140 allocates the necessary free memory space in the node 500 as the amount of checkpointing storage memory space needed for checkpointing the data 508. On the other hand, the controller 140 can send a checkpointing memory allocation request message 510 from the node 500 to at least another node in the plurality of nodes in the network in response to determining that not enough free memory space is available in the at least one NVRAM 504 in the node 500 for use as the amount of checkpointing storage memory space (block 604). Not enough free memory space entails that either there is no free memory space or there is insufficient free memory available in the at least one NVRAM 504 in the node 500. Thus, by sending out the checkpointing memory allocation request message 510, the controller 140 determines whether the at least another node has the necessary free memory space available for checkpointing the data 508.

In some embodiments, the checkpointing memory request message 506 includes information on how much memory space is needed to checkpoint the data 508. Alternatively or additionally, the controller 140 interfaces with the application so that the application can directly convey to the controller 140 how much of the data 508 is to be checkpointed. As another alternative, the controller 140 assumes that all data associated with the application needs to be checkpointed.

In some embodiments, sending of the checkpointing memory allocation request message 510 is targeted. For example, the controller 140 keeps a preliminary destination table 512 that lists potential nodes with the available free memory space. This preliminary destination table 512 is generated based on historical interactions (e.g., previous checkpointing memory allocation requests sent by the node 500 to other nodes and returned responses from the other nodes). Alternatively or additionally, the preliminary destination table 512 is generated based on location (e.g., nearby nodes to the node 500). In any event, the controller 140 sends or broadcasts the checkpointing memory allocation request message 510 to any or all of the nodes in the preliminary destination table 512 in order to find the available nodes that can checkpoint the data 508.

The controller 140 then obtains a checkpointing memory allocation reply message 514 from the at least another node in the plurality of nodes in the network in response to the checkpointing memory allocation request message 510 (block 606).

Accordingly, the controller 140 allocates a first portion of the amount of checkpointing storage memory space to free memory space available in the at least one NVRAM 504 in the node 500, and allocates remaining portions of the amount of checkpointing storage memory space to free memory space available in at least one NVRAM in the at least another node in response to the checkpointing memory allocation reply message 514 (block 608).

If no free memory space is available in the at least one NVRAM 504 in the node 500, then the controller 140 would allocate all portions of the amount of checkpointing storage memory space needed for checkpointing the data 508 to the free memory space available in the at least one NVRAM in the at least another node. Further, if the checkpointing memory allocation reply message 514 indicates that the at least one NVRAM in the at least another node does not have free memory space available or does not have enough free memory space available, then the controller 140 continues to communicate with additional nodes to find the necessary free memory space.

The allocation of the checkpointing storage memory space among different nodes can be based on various factors. For example, allocating the first portion of the amount of checkpointing storage memory space to the free memory space available in the at least one NVRAM 504 in the node 500 and allocating the remaining portions of the amount of checkpointing storage memory space to the free memory space available in the at least one NVRAM in the at least another node are based on a size of the data 508 corresponding to the application. This entails that the size of the data 508 will determine whether the allocation occurs in the node 500 alone (if the free memory space in the node 500 is large enough to be used as the checkpointing storage memory space for the data 508), or among the node 500 and the at least another node (if the free memory space in the node 500 alone is not large enough).

As another example, allocating the first portion of the amount of checkpointing storage memory space to the free memory space available in the at least one NVRAM 504 in the node 500 and allocating the remaining portions of the amount of checkpointing storage memory space to the free memory space available in the at least one NVRAM in the at least another node are based on whether execution of the application is critical. For example, the execution of the application is critical or important if the application is computationally intensive to run, takes a long time to run, runs frequently, etc.

Thus, if the data 508 is related to a critical or important application, then it is desirable to checkpoint the data 508 in as few nodes as possible. In this manner, the checkpointed data is readily available in one place for easy access and fast retrieval. One way to accomplish this is to reserve a certain amount or portion of the free memory space in the at least one NVRAM 504 in the node 500 just for checkpointing data related to the critical or important application.

Once allocated, the controller 140 checkpoints the data 508 corresponding to the application into the amount of checkpointing storage memory space allocated or distributed among the at least one NVRAM 504 in the node 500 and the at least one NVRAM in the at least another node.

After checkpointing the data 508, the controller 140 stores the identity of the plurality of nodes in the network in which the data 508 corresponding to the application was checkpointed to (block 610). The identity of the plurality of nodes in the network can be stored in a recovery list, for example (not shown). The recovery list allows the controller 140 to find and retrieve the checkpointed data at a later time (i.e., after the occurrence of a failure). The recovery list can be stored in the node 500 (e.g., in a portion of the at least one NVRAM 504) or in a centralized storage unit that is accessed by the controller 140 in the node 500.

In response to a failure event, the controller 140 restores a state of the application prior to the failure event based on recovered checkpointed data using the identity of the plurality of nodes in the network (block 612). In doing so, the application can be restarted from the point just prior to the failure event (block 613). This ensures the continuity and/or completion of the application.

Additionally, the controller 140 determines whether checkpointing mirroring is required. That is, whether the checkpointed data is to be duplicated in other nodes to improve redundancy and reliability. As such, the controller 140 determines a second checkpointing storage memory space for mirroring checkpointed data in response to determining that checkpointing mirroring is required. Afterward, the controller 140 mirrors the checkpointed data in the second checkpointing storage memory space distributed among the available NVRAMs in the plurality of nodes in the network.

In some embodiments, distributed checkpointing is used to create a unified checkpointing storage memory array out of the free memory space owned or allocated by each controller 140 in each node. Thus, the checkpointing storage memory array is akin to a redundant array of independent disks (RAID) architecture and represents a single logical unit with enough memory storage space to safely checkpoint an entire memory footprint of a requestor application. This can be useful for the checkpointing mirroring operation. For example, the checkpointing storage memory array can use a RAID 1 architecture, in which the checkpointed data is written identically to all the free memory spaces in the array, thereby producing a mirrored data set. Higher level RAID architectures are also possible to provide even higher redundancy and reliability.

Figure 7:
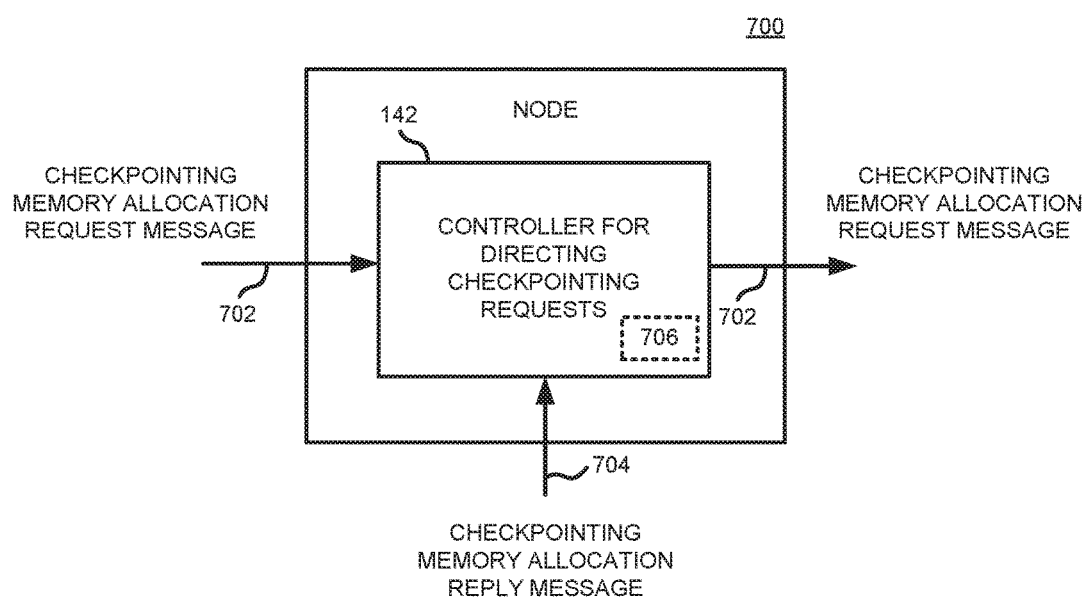
FIG. 7 is a block diagram illustrating one example of a node in which distributed checkpointing is provided.
Figure 8:
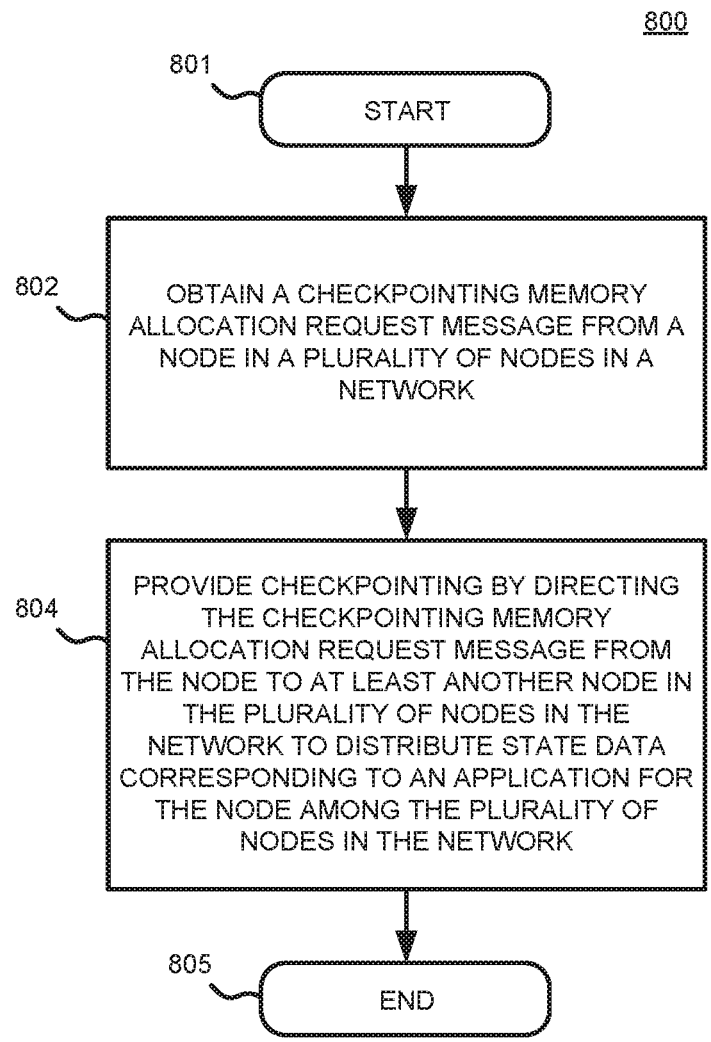
FIG. 8 is a flowchart illustrating one example of a method for providing distributed checkpointing.

FIGS. 7 and 8 illustrate an example node 700 and an example method 800, respectively. The node 700 can be a switch node in a plurality of nodes in a network. For example, the node 700 represents any of the switch nodes 132-136 in FIG. 1. The node 700 includes a controller 142.

The method 800 is carried out by the controller 142 in the node 700 to provide distributed checkpointing. The controller 142 is notified of a checkpointing procedure (block 801). In particular, the controller 142 obtains a checkpointing memory allocation request message 702 from a node in the plurality of nodes in the network (block 802). However, because the node 700 does not have any NVRAM, the controller 142 provides checkpointing by directing the checkpointing memory allocation request message 702 from the node to at least another node in the plurality of nodes in the network to distribute state data corresponding to an application for the node among the plurality of nodes in the network (block 804). The controller 142 then waits for replies or responses from the at least another node (block 805).

The controller 142 can choose to ignore or drop the checkpointing memory allocation request message 702 if the message is a repeated message, or if there are too many other checkpointing memory allocation request messages being received by the controller 142. Alternatively or additionally, the controller 142 is configured to follow a certain rule or policy in which checkpointing memory allocation request messages from some nodes (e.g., nodes that do not run critical or important applications) are ignored.

The controller 142 obtains a checkpointing memory allocation reply message 704 from the at least another node in response to the checkpointing memory allocation request message 702. The controller 142 determines whether free memory space is available in at least one NVRAM in the at least another node for use as checkpointing storage memory space for checkpointing the data corresponding to the application in response to the checkpointing memory allocation reply message 704. The controller 142 also directs the checkpointing memory allocation request message 702 from the node to other nodes in the plurality of nodes in the network in response to determining that free memory space is not available in the at least one NVRAM in the at least another node for use as the checkpointing storage memory space.

In some embodiments, the controller 142 knows ahead of time which node has the necessary free memory space available. In this scenario, the controller 142 stores a checkpointing table 706 (similar to the checkpointing table 144 in FIG. 1), which lists nodes that have free memory space available in their NVRAMs. The controller 142 generates the checkpointing table 706 by obtaining information indicating free memory space availability in at least one NVRAM from each of the plurality of nodes in the network.

Upon receiving the checkpointing memory allocation request message 702 from the node, the controller 142 searches the checkpointing table 706 for nodes that have the necessary free memory space available in their NVRAM, and forwards the checkpointing memory allocation request message 702 to those nodes. More particularly, the controller 142 searches the checkpointing table 706 to find the at least another node having the free memory space available in at least one NVRAM in the at least another node for use as checkpointing storage memory space for checkpointing the data corresponding to the application. Afterward, the controller 142 directs the checkpointing memory allocation request message 702 from the node to the at least another node. The controller 142 can also delay forwarding the checkpointing memory allocation request message 702 until a node with the necessary free memory space is found or becomes available. In this manner, the controller 142 acts as a master controller that knows where all the free memory spaces are and directs the various checkpointing memory allocation request messages accordingly.

Among other advantages, the methods and apparatus allow the re-use of existing memory space in nodes for checkpointing operations, which helps to reduce the overall memory footprint requirement. It is contemplated that the methods and apparatus can be applied to many systems that require high reliability and availability, such as servers, high-performance computing, embedded systems, etc. Persons of ordinary skill in the art would recognize and appreciate further advantages and applications as well.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto. The above detailed description of the embodiments and the examples described therein have been presented for the purposes of illustration and description only and not by limitation. It is therefore contemplated that the present invention cover any and all modifications, variations, or equivalents that fall within the scope of the basic underlying principles disclosed above and claimed herein.

What is claimed is:

1. A method for checkpointing data, the method comprising:
   determining, by a controller, an amount of checkpointing storage memory space needed for checkpointing state data corresponding to an application; and
   checkpointing, by the controller, the state data corresponding to the application into the amount of checkpointing storage memory space by distributing the state data among available non-volatile random access memories (NVRAMs) in a plurality of nodes in a network based on the determination.

2. The method of claim 1, wherein checkpointing the state data comprises:
   storing, by the controller, a portion of the state data in available NVRAMs in a node executing the application in the plurality of nodes in the network; and
   distributing, by the controller, a remainder of the state data among the available NVRAMs in other nodes of the plurality of nodes in the network.

3. The method of claim 2, wherein distributing the remainder of the state data comprises:
   sending, by the controller, a checkpointing memory allocation request message to at least another node in the plurality of nodes in the network in response to determining that there is not enough free memory space in the available NVRAMs in the node executing the application for checkpointing.

4. The method of claim 1, wherein checkpointing the state data comprises:
   obtaining, by the controller, a checkpointing memory request message from a node in the plurality of nodes in the network;
   profiling, by the controller, at least one NVRAM in the node to determine whether free memory space is available in the at least one NVRAM in the node for use as the amount of checkpointing storage memory space in response to the checkpointing memory request message; and
   sending, by the controller, a checkpointing memory allocation request message from the node to at least another node in the plurality of nodes in the network in response to determining that not enough free memory space is available in the at least one NVRAM in the node for use as the amount of checkpointing storage memory space.

5. The method of claim 4, further comprising:
obtaining, by the controller, a checkpointing memory allocation reply message from the at least another node in the plurality of nodes in the network in response to the checkpointing memory allocation request message; and
allocating, by the controller, a first portion of the amount of checkpointing storage memory space to free memory space available in the at least one NVRAM in the node, and allocating remaining portions of the amount of checkpointing storage memory space to free memory space available in at least one NVRAM in the at least another node in response to the checkpointing memory allocation reply message.

6. The method of claim 5, wherein allocating the first portion of the amount of checkpointing storage memory space and allocating the remaining portions of the amount of checkpointing storage memory space are based on at least one of: a size of the state data corresponding to the application or whether execution of the application is critical.

7. The method of claim 1, further comprising:
storing, by the controller, an identity of the plurality of nodes in the network in which the state data corresponding to the application was checkpointed to; and
in response to a failure event, restoring, by the controller, a state of the application prior to the failure event based on recovered checkpointed state data using the identity of the plurality of nodes in the network.

8. The method of claim 1, further comprising:
determining, by the controller, a second checkpointing storage memory space for mirroring checkpointed data in response to determining that checkpointing mirroring is required; and
mirroring, by the controller, the checkpointed state data into the second checkpointing storage memory space distributed among the available NVRAMs in the plurality of nodes in the network.

9. A hardware controller comprising logic circuitry configured to:
determine an amount of checkpointing storage memory space needed for checkpointing state data corresponding to an application; and
checkpoint the state data corresponding to the application into the amount of checkpointing storage memory space by distributing the state data among available non-volatile random access memories (NVRAMs) in a plurality of nodes in a network based on the determination.

10. The hardware controller of claim 9, wherein the logic circuitry is further configured store a portion of the state data in available NVRAMs in a node executing the application in the plurality of nodes in the network, and distribute a remainder of the state data among the available NVRAMs in other nodes of the plurality of nodes in the network.

11. The hardware controller of claim 10, wherein distributing the remainder of the state data comprises sending a checkpointing memory allocation request message to at least another node in the plurality of nodes in the network in response to determining that there is not enough free memory space in the available NVRAMs in the node executing the application for checkpointing.

12. The hardware controller of claim 9, wherein the logic circuitry is further configured to:
obtain a checkpointing memory request message from a node in the plurality of nodes in the network;
profile at least one NVRAM in the node to determine whether free memory space is available in the at least one NVRAM in the node for use as the amount of checkpointing storage memory space in response to the checkpointing memory request message; and
send a checkpointing memory allocation request message from the node to at least another node in the plurality of nodes in the network in response to determining that not enough free memory space is available in the at least one NVRAM in the node for use as the amount of checkpointing storage memory space.

13. The hardware controller of claim 12, wherein the logic circuitry is further configured to:
obtain a checkpointing memory allocation reply message from the at least another node in the plurality of nodes in the network in response to the checkpointing memory allocation request message; and
allocate a first portion of the amount of checkpointing storage memory space to free memory space available in the at least one NVRAM in the node, and allocate remaining portions of the amount of checkpointing storage memory space to free memory space available in at least one NVRAM in the at least another node in response to the checkpointing memory allocation reply message.

14. The hardware controller of claim 13, wherein allocating the first portion of the amount of checkpointing storage memory space and allocating the remaining portions of the amount of checkpointing storage memory space are based on at least one of: a size of the state data corresponding to the application or whether execution of the application is critical.

15. The hardware controller of claim 9, wherein the logic circuitry is further configured to:
store an identity of the plurality of nodes in the network in which the state data corresponding to the application was checkpointed to; and
in response to a failure event, restore a state of the application prior to the failure event based on recovered checkpointed state data using the identity of the plurality of nodes in the network.

16. The hardware controller of claim 9, wherein the logic circuitry is further configured to:
determine a second checkpointing storage memory space for mirroring checkpointed data in response to determining that checkpointing mirroring is required; and
mirror the checkpointed state data into the second checkpointing storage memory space distributed among the available NVRAMs in the plurality of nodes in the network.

17. A hardware controller comprising logic circuitry configured to:
obtain a checkpointing memory allocation request message from a node in a plurality of nodes in a network; and
provide checkpointing by directing the checkpointing memory allocation request message from the node to at least another node in the plurality of nodes in the network to distribute state data corresponding to an application for the node among the plurality of nodes in the network.

18. The hardware controller of claim 17, wherein the logic circuitry is further configured to:

obtain a checkpointing memory allocation reply message from the at least another node in response to the checkpointing memory allocation request message;

determine whether free memory space is available in at least one non-volatile random access memory (NVRAM) in the at least another node for use as checkpointing storage memory space for checkpointing the state data corresponding to the application in response to the checkpointing memory allocation reply message; and direct the checkpointing memory allocation request message from the node to other nodes in the plurality of nodes in the network in response to determining that free memory space is not available in the at least one NVRAM in the at least another node for use as the checkpointing storage memory space.

19. The hardware controller of claim 17, wherein the logic circuitry is further configured to search a checkpointing table to find the at least another node having free memory space available in at least one NVRAM in the at least another node for use as checkpointing storage memory space for checkpointing the state data corresponding to the application.

20. The hardware controller of claim 19, wherein the logic circuitry is further configured to generate the checkpointing table by obtaining information indicating free memory space availability in at least one NVRAM from each of the plurality of nodes in the network.

21. A node comprising:
at least one processor;
at least one non-volatile random access memory (NVRAM); and
a controller coupled to the at least one processor and the at least one NVRAM, the controller configured to:
   determine an amount of checkpointing storage memory space needed for checkpointing state data corresponding to an application being executed by the at least one processor in the node;
   determine available free memory space in the at least one NVRAM in the node for use as the amount of checkpointing storage memory space; and
   checkpoint the state data corresponding to the application into the amount of checkpointing storage memory space by distributing the state data among the available free memory space determined in the at least one NVRAM in the node and available NVRAMs in other nodes of a plurality of nodes in a network.

* * * * *